United States Patent [19]

Garrigue et al.

[11] Patent Number: 4,977,237

[45] Date of Patent: Dec. 11, 1990

[54] NEW PROCESS FOR MANUFACTURING UREA/FORMALDEHYDE RESINS

[75] Inventors: Roger Garrigue; Jack Lalo, both of Toulouse, France

[73] Assignee: Norsolor S.A., Paris La Defense, France

[21] Appl. No.: 442,863

[22] Filed: Nov. 29, 1989

Related U.S. Application Data

[63] Continuation of Ser. No. 345,279, May 1, 1989, abandoned.

[30] Foreign Application Priority Data

Apr. 29, 1988 [FR] France ................. 88 05746

[51] Int. Cl.⁵ .................. C08G 12/12; C08G 14/08
[52] U.S. Cl. ..................... 528/230; 528/246; 528/249; 528/256; 525/154; 525/158
[58] Field of Search ............. 528/230, 246, 249, 256; 525/154, 158

[56] References Cited

U.S. PATENT DOCUMENTS 4,395,306 7/1983 Killat ..................... 162/156
4,473,678 9/1984 Fink et al. ............... 524/211

FOREIGN PATENT DOCUMENTS 201386 11/1986 European Pat. Off. .
202976 11/1986 European Pat. Off. .
827059 4/1938 France .
482897 9/1937 United Kingdom .

OTHER PUBLICATIONS

CA 110(22): 193815r, "Addition of a Double Bond to Urea–Formaldehyde Polycondensates".
CA 107(2): 7786x, "Preparation of Acrylic Derivatives of Urea".
CA 94(14): 104598h, "Glass Fiber Mat with Improved Binder".
CA 97(2): 8074a, "Aminoplast Solutions".
Chemical Abstracts, vol. 85, No. 26, Dec. 16, 1976, p. 32, Abstract No. 193563x.
Chemical Abstracts, vol. 76, No. 8, Feb. 21, 1972, p. 23, Abstract No. 34886c.

*Primary Examiner*—John Kight, III
*Assistant Examiner*—S. A. Acquah
*Attorney, Agent, or Firm*—Millen, White & Zelano

[57] ABSTRACT

New process for manufacturing urea/formaldehyde resins.

New process, according to which a urea/formaldehyde precondensate containing monomethylolacrylamidomethyleneurea is added to the urea/formaldehyde resins.

Applications for the gluing of wood, in aminoplastic resins.

6 Claims, No Drawings

PROCESS FOR MANUFACTURING UREA/FORMALDEHYDE RESINS

This application is a continuation of application Ser. No. 345,279, filed May 1, 1989, now abandoned.

CROSS REFERENCE TO RELATED APPLICATIONS

This application is related to applicants' concurrently filed U.S. application entitled: New Acrylic Derivative of Urea, Ser. No. 345,268, filed May 1, 1989 and New Additives for Use in Aminoplastic Resins, Ser. No. 345,267, filed May 1, 1989, priority based on respective French application No. 88 05745 and 88 05744, filed on Apr. 29, 1988.

BACKGROUND OF THE INVENTION

The present invention relates to a new process for manufacturing aminoplastic resins. It relates more especially to a process for manufacturing urea/formaldehyde resins containing acrylic derivatives of urea.

Aminoplastic resins are known products which are widely used in the wood industry for the manufacture, in particular, of chipboard sheets. The aminoplastic resins most commonly used are urea/formaldehyde resins. They are manufactured in a known manner by the condensation of urea and formaldehyde at a pH of between 4 and 7 and at a temperature in the region of the boiling point: this condensation reaction is preferably carried out in several stages.

The main drawback of urea/formaldehyde resins is that of producing high emissions of free formaldehyde. An attempt has been made to reduce the level of free formaldehyde by employing various manufacturing processes: unfortunately, when it is desired to achieve especially low levels of formaldehyde, experience shows that this objective is accompanied both by a decrease in the reactivity and stability of the resins and also by a degradation of the mechanical properties of the finished sheets. It has also been proposed, in order to eliminate free formaldehyde, to use resins devoid of formaldehyde, in particular resins based on solutions if isocyanate. Unfortunately, the problem of formaldehyde is replaced by that of isocyanates, whose effect on man is more deleterious and longer lasting than that of formaldehyde, to the point where the presence of free isocyanate groups in chipboard sheets has been detected even several years after their manufacture.

It has also been proposed to add melamine during the manufacture of urea/formaldehyde resins. Unfortunately, the use of melamine with traditional urea/formaldehyde resins begins to be effective only at and above levels which can reach 20% and more, thereby ruling out its use on commercial grounds on account of its cost. It has thus been proposed to lower the level of melamine to values below 10%. A decrease in the reactivity of these resins is then observed, which is especially detrimental to the maintenance of commercially acceptable rates of manufacture. Moreover, even though an improvement in the properties of the finished sheets in respect of their resistance to moisture is observed, this improvement is still not sufficiently acceptable. The need hence arises to have at one's disposal urea/formaldehyde resins which, while possessing good reactivity, enable finished sheets to be manufactured possessing good mechanical characteristics linked as well with reduced levels of emission of free formaldehyde.

SUMMARY OF THE INVENTION

The present invention relates to a new process for manufacturing urea/formaldehyde resins, according to which urea and formaldehyde are condensed, characterized in that precondensates of urea and formaldehyde containing monomethylolacrylamidomethyleneurea are added during the synthesis of the urea/formaldehyde resin.

It was, in effect, found that the use of such additives in urea/formaldehyde resins led to resins possessing sufficient reactivity, and enabled sheets of wood to be manufactured possessing good mechanical characteristics, especially a good resistance to humidity, while yielding reduced emissions of free formaldehyde.

The process of the present application consists in adding additives consisting of formaldehyde/urea condensate containing monomethylolacrylamidomethyleneurea during the synthesis of urea/formaldehyde resins.

These additives are new products which form the subject of the above cross-referenced application, New Additives Suitable for Use in Aminoplastic Resins. These additives may be prepared according to two procedures. According to the first procedure, acrylamidomethyleneurea is reacted with formaldehyde. According to the second procedure, acrylamidomethyleneurea is added to a urea/ formaldehyde precondensate.

According to the process of the present application, additives consisting of formaldehyde/urea condensate containing monomethylolacrylamidomethyleneurea are added during the synthesis of urea/formaldehyde resins. According to the invention, the quantities of additives are such that the percentage of urea/formaldehyde precondensate containing monomethylolacrylamidomethyleneurea in the resin is between 16 and 32% by weight, expressed relative to the weight of the solution of resin.

The additives consisting of formaldehyde/urea condensate containing monomethylolacrylamidomethyleneurea are employed in the urea/formaldehyde resins during the synthesis of these resins. These urea/formaldehyde resins are conventional resins which possess an F/U mole ratio of between 0.8 and 2. The use of these resins thus modified enables wood-based materials, namely chipboard sheets or plywood, possessing good physicochemical characteristics, to be manufactured. The examples which follow illustrate the present invention.

EXAMPLE 1

(a) Preparation of formaldehyde/urea condensate containing monomethylolacrylamidomethyleneurea according to the procedure described in the above cross-referenced application entitled: New Additives Suitable for the Manufacture of Aminoplastics.

60 g of acrylamidomethyleneurea and 120 mg of hydroquinone methyl ether are introduced in a reactor into a solution of 349.8 g of formaldehyde/urea condensate (49.02% of formaldehyde, 20.13 of urea). The pH of the reaction medium is 7.5; the temperature is maintained at 70° C. until the acrylamidomethyleneurea has dissolved, which requires 30 minutes.

(b) Preparation of the modified resin.

723.95 g of a urea/formaldehyde precondensate (49.02% formaldehyde, 20.13% urea), 133.6 g of water and 192.25 g of urea are introduced into a reactor.

The reaction medium is heated for 20 minutes under reflux, at a pH equal to 7 by addition of sodium hydroxide. The pH is then brought down to 5 by adding 10% strength formic acid solution.

The pH is then adjusted to 7 by adding sodium hydroxide solution, the reaction medium being maintained at 80° C. The 409.8 g of formaldehyde/urea condensate modified with monomethylolacrylamidomethyleneurea, prepared above, are then added, followed by 47.5 g of water.

69.15 g of water are removed by distillation under vacuum. 562.5 g of urea are then added at a temperature of 40° C. and at pH 9.2.

The final resin obtained contains 20% of urea/formaldehyde precondensate containing monomethylolacrylamidomethyleneurea.

The characteristics of the resin obtained are summarized in Table 1. In this table, the characteristics of the sheets manufactured with this resin are shown. By way of comparison, sheets were manufactured with a urea/formaldehyde resin containing 3% of melamine, and with a conventional urea/formaldehyde resin. The three resins used all have the same $F/NH_2$ ratio.

The sheets were produced under the following conditions:

| Gluing | 7% dry resin/dry shavings | |
|---|---|---|
| Sheet thickness | 16 mm | |
| Pressing | Pressure | 30 daN/cm$^2$ |
| | Temperature | 180° C. |
| | Constant pressure time | 4 minutes |

The characteristics of the sheets were determined according to the following standards:
Formaldehyde content (perforator) : Standard EN 120
Thickness, density : Standard NFB 51 222
Traction V 20 : Standard NFB 51 250
Swelling (%) : Standard NFB 51 252

EXAMPLE 2

Formaldehyde-urea condensate containing monomethylolacrylamidomethyleneurea is manufactured according to the procedure of Example 1, using 50 g of acrylamidomethyleneurea and 188 g of formaldehyde/urea condensate (48.8% formaldehyde, 20.13% urea): 238 g modified formaldehyde/urea condensate are obtained.

330.4 g of formaldehyde/urea condensate (formaldehyde: 48.8%; urea: 20.35%), 60.2 g of water and 86.3 g of urea are added into a reactor.

The reaction medium is heated under reflux for 20 minutes, the pH being maintained at a value of 7 by adding sodium hydroxide solution. The pH is then brought down to a value in the region of 5 by adding formic acid solution.

After the pH has been adjusted with sodium hydroxide solution to approximately 7 and the reaction mixture heated, the 238 g of solution of formaldehyde/urea condensate modified with monomethylolacrylamidomethyleneurea, prepared above, are added. 35 g of water are then added. 19.4 g of water are then removed by distillation under vacuum, and 270 g of urea are added thereafter at pH 9.2 and at a temperature of 40° C.

The final resin obtained contains 24% of formaldehyde/urea condensate modified with monomethylolacrylamidomethyleneurea.

Table 2 summarizes the characteristics of the resin, as well as those of the sheets manufactured with this resin. By way of comparison, the characteristics of a urea/formaldehyde resin and the properties of the sheets are shown.

TABLE 1

| Resins | Modified urea/formaldehyde resin of Example 1 | Urea/formaldehyde resin modified with 3% of melamine | Unmodified urea/formaldehyde resin |
|---|---|---|---|
| F/NH$_2$ | 0.535 | 0.535 | 0.535 |
| Viscosity mPa.s | 280 | 720 | 360 |
| Dry extract % | 65.7 | 65 | 64.4 |
| Gelling time at 80° C. (seconds) | 145 | 540 | 155 |
| Water tolerance at 20° C. | 5/1 | 1.25/1 | |
| Tacky mixtures | | | |
| Viscosity mPa.s | 76 | 80 | 60 |
| Gelling time at 100° C. (seconds) | 80 | — | 80 |
| Sheets | | | |
| Swelling 24 h, cold water (%) | 13.6 | 14.9 | 15.7 |
| Absorption % (for density of 600 kg/m$^3$) | 65.5 | 67.5 | 66.5 |
| Traction N/mm$^2$ | 0.57 | 0.54 | 0.57 |
| Formaldehyde, perforator, mg/100 g (iodine) | 8.3 | 8.1 | 7.6 |
| Moisture (%) | 6.5 | 6.9 | 6.5 |

TABLE 2

| Resins | Urea/formaldehyde resin of Example 2 | Unmodified urea/formaldehyde resin |
|---|---|---|
| F/NH$_2$ | 0.535 | 0.535 |
| Viscosity mPa.s | 180 | 360 |
| Dry extract % | 66 | 64.4 |
| Gelling time at 80° C. (seconds) | 191 | 155 |
| Water tolerance | 4.1/1 | |

TABLE 2-continued

| Resins | Urea/formaldehyde resin of Example 2 | Unmodified urea/formaldehyde resin |
|---|---|---|
| at 20° C. | | |
| Tacky mixtures | | |
| Viscosity mPa.s | 64 | 60 |
| Gelling time at 100° C. (seconds) | 130 | 80 |
| Sheets | | |
| Swelling 24 h, cold water (%) | 9.6 | 14.3 |
| Absorption % (for density of 600 kg/m$^3$) | 34.1 | 49.8 |
| Traction N/mm$^2$ (for density of 650 kg/m$^3$) | 0.67 | 0.6 |
| Formaldehyde, perforator, mg/100 g (iodine) | 11.3 | 10.7 |

Without further elaboration, it is believed that one skilled in the art can, using the preceding description, utilize the present invention to its fullest extent. The preferred specific embodiments are, therefore, to be construed as merely illustrative, and not limitative of the disclosure in any way whatsoever.

In the foregoing, all temperatures are set forth uncorrected in degrees Celsius and unless otherwise indicated, all parts and percentages are by weight.

The entire texts of all applications, patents and publications, cited above, and of corresponding French application No. 88 05746, are hereby incorporated by reference.

What is claimed is:

1. A new process for manufacturing urea/formaldehyde resins, according to which urea and formaldehyde are condensed, characterized in that precondensates of urea and formaldehyde containing monomethylolacrylamidomethyleneurea are added during the synthesis of the urea/formaldehyde resin.

2. A new process according to claim 1, characterized in that the percentage of urea/formaldehyde precondensate containing monomethylolacrylamidomethyleneurea in the urea/formaldehyde resin is between 16 to 32% by weight, relative to the weight of the solution of resin.

3. A urea/formaldehyde/nomethylol acrylamidomethylene urea resin produced in accordance with claim 1.

4. A urea/formaldehyde/momethylol acrylamidomethylene urea resin produced in accordance with claim 2.

5. In a sheet comprising wood and glue, the improvement wherein the glue comprises the resin of claim 3.

6. In a sheet comprising wood and glue, the improvement wherein the glue comprises the resin of claim 4.

* * * * *